(12) United States Patent
Heigl

(10) Patent No.: US 6,296,272 B1
(45) Date of Patent: Oct. 2, 2001

(54) AIRBAG

(75) Inventor: Jürgen Heigl, Böbingen (DE)

(73) Assignee: Trw Occupant Restraint Systems GmbH & Co. Kg, Alfdorf (DE)

(*) Notice: Subject to any disclaimer, the term of this patent is extended or adjusted under 35 U.S.C. 154(b) by 0 days.

(21) Appl. No.: 09/319,497

(22) PCT Filed: Oct. 14, 1998

(86) PCT No.: PCT/EP98/06505

§ 371 Date: Jun. 7, 1999

§ 102(e) Date: Jun. 7, 1999

(87) PCT Pub. No.: WO99/19171

PCT Pub. Date: Apr. 22, 1999

(30) Foreign Application Priority Data

Oct. 15, 1997 (DE) .......................................... 297 18 305 U
Jan. 22, 1998 (DE) .......................................... 298 01 051 U
Aug. 20, 1998 (DE) .......................................... 298 14 961 U

(51) Int. Cl.[7] .................................................. B60R 21/22
(52) U.S. Cl. ...................................... 280/730.2; 280/743.1
(58) Field of Search ............................. 280/730.2, 743.1, 280/743.2, 739

(56) References Cited

U.S. PATENT DOCUMENTS

| 5,378,019 | * | 1/1995 | Smith et al. ...................... 280/743.1 |
| 6,010,149 | * | 1/2000 | Riedel et al. ..................... 280/730.2 |
| 6,062,594 | * | 5/2000 | Asano et al. ..................... 280/730.2 |
| 6,073,961 | * | 6/2000 | Bailey et al. .................... 280/730.2 |
| 6,170,860 | * | 1/2001 | Denz et al. ....................... 280/730.2 |
| 6,199,898 | * | 3/2001 | Masuda et al. ................... 280/730.2 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A gas bag, with several walls (3) of fabric material which delimit the interior of the gas bag, at least one separating cross-piece (23 to 27) which is formed by interweaving opposite wall regions and divides the interior of the gas bag into several chambers (15 to 21), is characterized in that the separating cross-piece (23 to 27) has at least one free end at which it widens and runs out in a drop shape (33, 35) or in a rounding (37).

28 Claims, 1 Drawing Sheet

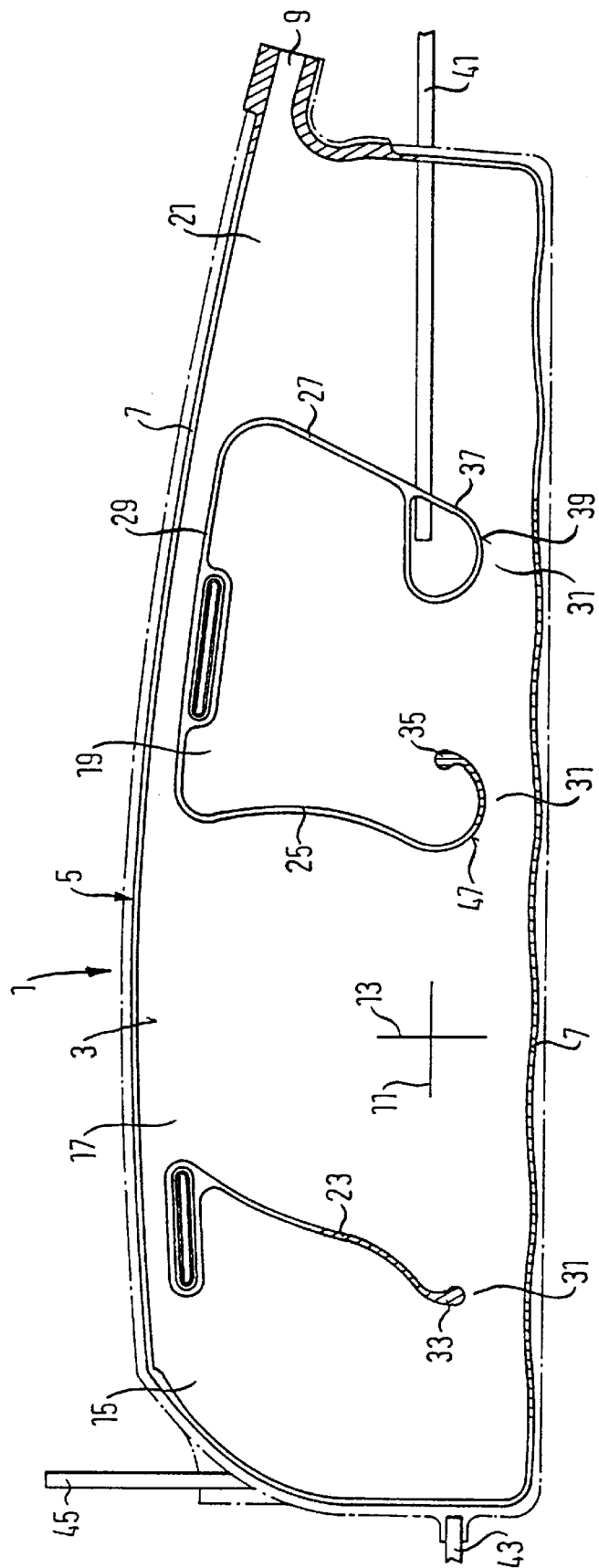

AIRBAG

The invention relates to a gas bag, with several walls of fabric material which delimit the interior of the gas bag, with at least one separating cross-piece which is formed by interweaving opposite wall regions and divides the interior of the gas bag into several chambers.

In particular during the unfolding of the gas bag, the fabric becomes extremely stressed, the stresses being able to become particularly high in the region of the separating cross-pieces and the peripheral edges where the fabric layers are sewn or interwoven with each other. The ends of the separating cross-pieces are likewise places at which the fabric material is exposed to high stresses, because the gas bag is inflated around the end and only the end holds the fabric layers together. In this region, the tearing of warp and weft threads can occur very easily, in particular, however, leaks can occur.

The invention provides a gas bag in which in the region of the free end of the separating cross-piece the stresses onto the fabric material and leaks are reduced. This is achieved in a gas bag of the type initially mentioned in that the separating cross-piece has at least one free end at which it widens and runs out in a drop shape or in a rounding. In this connection, "free end" means that the separating cross-piece does not continue for instance into the peripheral edge of the walls, but rather that the separating cross-piece terminates at a distance in front of the peripheral edge. As has been found, the stress onto the fabric material at the free end of the separating cross-piece with interwoven walls is distinctly reduced through this development.

The rounding is preferably closed peripherally. The separating cross-piece, in addition, runs as an elongated, linear but preferably curved line. According to a further development, the separating cross-piece extends transversely to the warp and the weft threads of the fabric material, so that the stress is distributed onto both and one of the two is not overstressed. Furthermore, warp and weft threads are held together, so that a displacement of the threads with respect to each other is reduced. This increases the tightness of the fabric material.

According to another development, the walls in the region of the end are interwoven with each other over the full surface within the rounding or the drop shape. Alternatively, however, also a peripheral line formed by interweaving can define the drop shape or the rounding, which is somewhat more favorably priced than the interweaving over the full surface.

With the preferred embodiment, the gas bag is a side gas bag having a large area, e.g. a so-called ABC gas bag, which protects the head of the occupant from contact with the lateral region of the vehicle. The gas bag consists of two opposite walls. At least one overflow channel connects the individual chambers with each other in terms of flow and provides for a pressure equalization. This overflow channel preferably runs along the lower edge of the unfolded, mounted gas bag. This has the advantage that individual chambers can firstly unfold in order to accelerate the unfolding process, and only in the second step does a pressure equalization take place. The overflow channels have the task, moreover, of acting like an overload valve, i.e. when the vehicle occupant plunges into a chamber, the gas can flow therefrom in a throttled manner into other chambers. Thereby, the hardness of the gas bag on impact is reduced.

Further features and advantages of the invention will be apparent from the following description and from the following drawing, to which reference is made.

The single drawing shows a fully unfolded side gas bag according to the invention, which extends from laterally of the front occupant to laterally of the rear occupant.

The gas bag shown in FIG. 1 consists of two opposite walls, each consisting of one fabric layer, of which only the front wall 3 is to be seen. The other wall, which lies behind the wall 3, is constructed in an identical manner. The gas bag 1 is adapted in the region of its upper peripheral rim 5 to the profile of the roof frame of the vehicle. The two walls are interwoven with each other in one piece in the region of the entire peripheral rim. The interwoven peripheral rim is designated by 7. It extends around the entire outer periphery up to a filling opening 9 at the end of the gas bag on the rear side of the vehicle. The interwoven peripheral rim is linear, approximately 1 to 2 cm wide and runs along the lower, substantially horizontal region in an undulating form. Thereby, the warp and weft threads, which are illustrated by way of example with the aid of one thread 11 and 13, respectively, are subjected to lower stresses than in a case in which the interwoven region were to run for example parallel to the warp threads 11.

The side gas bag which is shown has several chambers 15, 17, 19 and 21 which, however, are all in flow connection with each other. The chambers are separated from each other by further interwoven, linear regions in the form of so-called separating cross-pieces 23, 25, 27. The separating cross-pieces 23 and 25 run in a curved shape and obliquely to the warp and the weft threads 11 and 13, respectively. The separating cross-piece 27 runs linearly and obliquely to the warp and the weft threads 11 and 13, respectively. The separating cross-pieces 25 and 27 continue at their upper end into a region 29, which runs parallel to the upper rim of the gas bag. A gas lance can be inserted between the region 29 and the upper rim.

The separating cross-pieces do not extend up to the lower peripheral rim of the gas bag running substantially horizontally, but rather terminate at a distance therefrom in a free end. Between this free end and the lower peripheral rim 7, overflow channels 31 are thereby produced which provide for a pressure equalization between the individual chambers 15 to 21. The free ends of the linear separating cross-pieces 23 to 27 terminate in the form of a drop 33, 35 or, as regards the separating cross-piece 27, in a rounding 37 which is closed peripherally. Inside this rounding 37, the opposite walls are not interwoven with each other over the full surface, as is the case with the ends having a drop shape 33 and 35. Rather, the rounding 37 is defined by a closed, frame-shaped peripheral line 39. In the non-interwoven region, delimited by the peripheral line 39, an anchoring band 41 is fastened, which is arrested by its other end in the region of the C column. Further anchoring bands are fastened in the region of the front end of the gas bag to the latter and are designated by 43 and 45.

The ends with the drop shape 33, 35 or with the rounding 37 provide for a smaller stress of the fabric material in the region of the ends of the separating cross-pieces 23 to 27. A combination of rounding and drop form is shown by the end of the separating cross-piece 25. Before reaching the drop shape 35, the separating cross-piece 25 in fact already runs in a curved shape, so that the shape of a U or of a partial spiral is produced, which is characterized by a curvature of less than 360°, here in fact 180°.

In the case of restraint, gas is introduced via the gas lance, which is not shown, into the gas bag. The gas flows via the outflow openings into the chambers 15 to 21 and leads to a rapid unfolding of the gas bag downwards. Then, when the gas bag is almost completely unfolded and offers its approximately entire surface for protection, the pressure equalization occurs between the individual chambers 15 to 21 via the overflow channels 31. The gas bag is braced between its anchoring bands 41 to 45 and positions itself in a stable manner in the vehicle to the side of the heads of the front and rear occupants and in front of the side windows. In the case of restraint, the head of the rear occupant can strike onto the gas bag approximately in the region of the chamber 21 and hence be protected from an impact onto the side window. The head of the front occupant is protected from contact with the side window in the region of the chamber 17 the case of a side impact. In the case of an impact from obliquely to the front, the chambers 15 and 19 can offer additional protection.

What is claimed is:

1. A gas bag comprising:
   several walls (3) of fabric material which define an interior of the gas bag, and
   at least one cross-piece (23, 25, 27) formed by interweaving opposite wall regions and which separate the interior of the gas bag into several chambers (15, 17, 19, 21),
   said cross-piece (23, 25, 27) having at least one free end which widens and forms one of a drop shape (33, 35) and a rounding (37).

2. The gas bag according to claim 1, wherein the rounding (37) is closed peripherally.

3. The gas bag according to claim 1, wherein said cross-piece (23, 25, 27) forms an elongated line.

4. The gas bag according to claim 1, wherein the fabric material has warp and weft threads (11, 13) and said cross-piece (23, 25, 27) runs transversely to the warp and weft threads (11, 13).

5. The gas bag according to claim 1, wherein the walls are interwoven over the entire wall surface within the drop shape (33, 35) and the rounding (37).

6. The gas bag according to claim 1, wherein the walls are not interwoven over the entire wall surface within the drop shape (33, 35) and the rounding (37) and the rounding and the drop shape is defined by a peripheral line (39) formed by interweaving.

7. The gas bag according to claim 1, wherein the gas bag is a side gas bag having a large area which protects the head of the occupant from contact with the lateral region of the vehicle and wherein the gas bag consists of two opposite walls (3) of fabric material.

8. The gas bag according to claim 7, wherein the gas bag extends in the inflated state from laterally of the front occupant to laterally of the rear occupant.

9. A gas bag comprising:
   several walls (3) of fabric material which define an interior of the gas bag,
   at least one cross-piece (23, 25, 27) formed by interweaving opposite wall regions and which separate the interior of the gas bag into several chambers (15, 17, 19, 21),
   said cross-piece (23, 25, 27) having at least one free end which widens and forms one of a drop shape (33, 35) and a rounding (37), and
   at least one overflow channel in flow connection between the chambers (15, 17, 19, 21),
   said one of the drop shape (33, 35) and the rounding (37) formed by said cross-piece being located adjacent the overflow channel.

10. The gas bag according to claim 9, wherein the gas bag is a side gas bag having a large area and the overflow channel (31), in the deployed and mounted state, runs along the lower peripheral rim.

11. The gas bag according to claim 9, wherein the rounding (37) is closed peripherally.

12. The gas bag according to claim 9, wherein said cross-piece forms an elongated line.

13. The gas bag according to claim 9, wherein the fabric material has warp and weft threads (11, 13) and said cross-piece (23, 25, 27) runs transversely to the warp and weft threads (11, 13).

14. The gas bag according to claim 9, wherein the walls are interwoven over the entire wall surface within the drop shape (33, 35) and the rounding (37).

15. The gas bag according to claim 9, wherein the walls are not interwoven over the entire wall surface within the drop shape (33, 35) and the rounding (37) and the rounding and the drop shape is defined by a peripheral line (39) formed by interweaving.

16. The gas bag according to claim 9, wherein the gas bag is a side gas bag having a large area which protects the head of the occupant from contact with the lateral region of the vehicle and wherein the gas bag consists of two opposite walls (3) of fabric material.

17. The gas bag according to claim 9, wherein the gas bag extends in the inflated state from laterally of the front occupant to laterally of the rear occupant.

18. The gas bag according to claim 9, wherein said cross-piece (23, 25, 27) forms a curve at least in front of the drop shape (33, 35) or the rounding (37).

19. The gas bag according to claim 18, wherein said cross-piece (25) forms one of a U-shape and a partial spiral before reaching the free end.

20. A gas bag comprising:
    several walls (3) of fabric material which define the interior of the gas bag, and
    at least one cross-piece (23, 25, 27) formed by interweaving opposite wall regions and which separate the interior of the gas bag into several chambers (15, 17, 19, 21),
    said cross-piece (23, 25, 27) having at least one free end which widens and forms one of a drop shape (33, 35) and a rounding (37),
    said cross-piece (23, 25, 27) forming a curve at least before forming one of the drop shape (33, 35) and the rounding (37).

21. The gas bag according to claim 20, wherein said cross-piece forms a U-shape or a partial spiral before reaching the end.

22. The gas bag according to claim 20, wherein the rounding (37) is closed peripherally.

23. The gas bag according to claim 20, wherein said cross-piece (23, 25, 27) forms an elongated line.

24. The gas bag according to claim 20, wherein the fabric material has warp and weft threads (11, 13) and said cross-piece (23, 25, 27) runs transversely to the warp and weft threads (11, 13).

25. The gas bag according to claim 20, wherein the walls are interwoven over the entire wall surface within the drop shape (33, 35) and the rounding (37).

26. The gas bag according to claim 20, wherein the walls are not interwoven over the entire wall surface within the drop shape (33, 35) and the rounding (37) and the rounding and the drop shape is defined by a peripheral line (39) formed by interweaving.

27. The gas bag according to claim 20, wherein the gas bag is a side gas bag having a large area which protects the head of the occupant from contact with the lateral region of the vehicle and wherein the gas bag consists of two opposite walls (3) of fabric material.

28. The gas bag according to claim 27, wherein the gas bag extends in the inflated state from laterally of the front occupant to laterally of the rear occupant.

* * * * *

UNITED STATES PATENT AND TRADEMARK OFFICE
CERTIFICATE OF CORRECTION

PATENT NO. : 6,296,272 B1
DATED : October 2, 2001
INVENTOR(S) : Jurgen Heigl

It is certified that error appears in the above-identified patent and that said Letters Patent is hereby corrected as shown below:

Column 3,
Line 32, delete "and which separate" and insert -- to connect said walls, said cross-piece separating --.
Line 34, after "21)," insert -- said cross-piece maintaining said walls connected to each other in a fully inflated state of said gas bag, --.

Signed and Sealed this

Twenty-ninth Day of April, 2003

JAMES E. ROGAN
*Director of the United States Patent and Trademark Office*